(No Model.)

E. A. SPERRY.
POWER TRANSMITTING DEVICE.

No. 545,920. Patented Sept. 10, 1895.

WITNESSES
A. F. Macdonald
B. B. Hull

INVENTOR
Elmer A. Sperry,
by
Geo. R. Blodget
Atty.

UNITED STATES PATENT OFFICE.

ELMER A. SPERRY, OF CLEVELAND, OHIO, ASSIGNOR TO THE GENERAL ELECTRIC COMPANY, OF NEW YORK.

POWER-TRANSMITTING DEVICE.

SPECIFICATION forming part of Letters Patent No. 545,920, dated September 10, 1895.

Application filed July 5, 1895. Serial No. 554,942. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Power-Transmitting Devices, of which the following is a specification.

This invention relates to that class of power-transmitting devices in which a driving and driven shaft are so connected by pivoted links that the movements of the shafts, relatively to each other from a concentric to an eccentric position will be so regulated that when power is being transmitted from one shaft to the other the latter may sustain vigerous shocks or blows and, by reason of its entire freedom of movement, not transfer them back to the driving-power connection, and at the same time the driving and the driven shaft may sustain various positions relative to each other.

The invention has for its object to provide an improved device of this character constructed and arranged as hereinafter set out and claimed.

Figure 1:
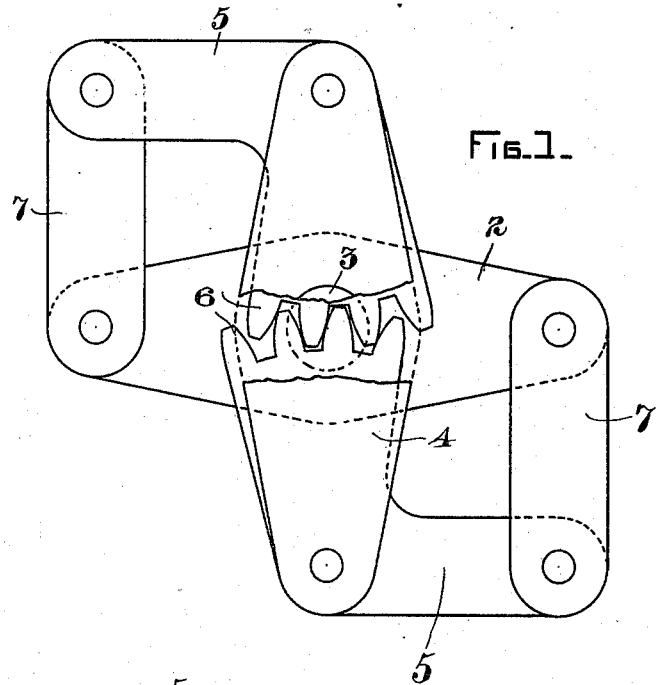
Figure 2:
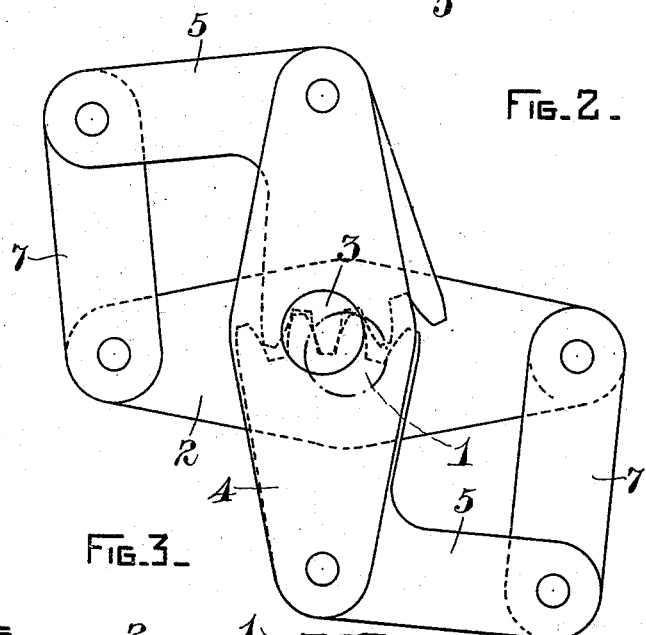
Figure 3:
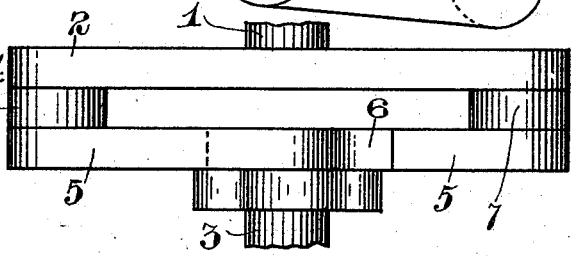

In the accompanying drawings, Figure 1 is a side view in elevation partly broken away, illustrating the invention. Fig. 2 is a side view in elevation of the invention, showing one of the positions taken when the shafts are out of alignment. Fig. 3 is a plan view of the invention.

1 indicates one of the power-shafts having fixed at one end thereof the horizontal double-ended member or cross-bar 2, and 3 the other power-shaft, having fixed to one end thereof the double-ended vertical member or cross-bar 4. The shafts 1 and 2 are flexibly connected together by a number of pivoted links, preferably as follows, though the number and arrangement of the links may be varied, so long as they effect the result obtained by those set forth.

At each end of the vertical member 4 is pivoted at its elbow an L-shaped or bell-crank lever link 5, the meeting ends of the vertical portion of the links 5 abutting, so as to form an engaging-joint, permitting said ends to rock on each other and serving to hold the shafts 1 and 2 in alignment when in normal position. As here shown, the joint preferably employed consists of several teeth 6, arranged like the segment of a gear-wheel, meshing with each other similar to the teeth of gear-wheels. The horizontal portions of the links are pivoted to one end of a link 7, the other end of which is pivoted to one end of the fixed horizontal member 2. In the normal position of the device, as shown in Fig. 1, the fixed member 4 on shaft 3 is in a vertical position and at a right-angle to the horizontal member 2. The joint formed by the vertical portions of the links 5, pivoted at their elbows to the member 4, and having the teeth 6 at their ends meshing together, serves to keep the shafts 1 and 3 in alignment or their normal position, and as the shafts 1 and 3 move out of alignment, on account of shocks or blows or from other causes, while permitting the shafts to move out of alignment, responding to the movements of the links 7 and members 1 and 3, at the same time regulate and govern such movement.

In Fig. 2 is shown a position assumed by the parts, the shafts having moved out of their concentric position.

Having described my invention, I claim—

1. A power-transmitting device consisting of a power shaft having a double-ended member fixed at one end thereof at a right angle thereto, a second power shaft having a double-ended member fixed at one end thereof at a right angle thereto and to the member fixed to the first shaft, and pivoted links intervening between the said fixed members and connecting the same together, a portion of said links having abutting ends forming a rocking joint substantially in alignment with the two shafts and governing the movement of the links and the alignment of the shafts.

2. A power-transmitting device consisting of a power shaft having a cross-bar at one end thereof, a second power shaft having a cross-bar at one end thereof at a right angle to the first cross-bar, bell-crank levers pivoted to the ends of the second cross-bar and having abutting ends forming a rocking joint, substantially in alignment with the two shafts and links pivoted at one end to the bell-crank levers and at the other to the first cross-bar, as set forth.

3. A power-transmitting device consisting of a power shaft having a cross-bar at one end thereof, a second power shaft having a cross-bar at one end thereof and at a right angle to the first cross-bar, bell-crank levers pivoted to the ends of the second cross-bar and having two adjacent ends formed with meshing gear teeth, and links pivoted to the bell-crank levers and to the first cross-bar, as set forth.

In witness whereof I have hereunto set my hand this 1st day of July, 1895.

ELMER A. SPERRY.

Witnesses:
ROY C. FOSTER,
M. NIELSON.